United States Patent [19]

Sweeney

[11] Patent Number: 4,740,316

[45] Date of Patent: Apr. 26, 1988

[54] METHOD OF AND APPARATUS FOR FILTERING

[75] Inventor: George Sweeney, Macclesfield, England

[73] Assignee: Paul de la Pena Limited, Pershore, England

[21] Appl. No.: 876,888

[22] PCT Filed: Oct. 8, 1984

[86] PCT No.: PCT/GB84/00344

§ 371 Date: Jul. 15, 1986

§ 102(e) Date: Jul. 15, 1986

[87] PCT Pub. No.: WO86/02014

PCT Pub. Date: Apr. 10, 1986

[51] Int. Cl.⁴ .............................................. B01D 33/32
[52] U.S. Cl. .................................. 210/783; 210/160; 210/328; 210/401
[58] Field of Search ............... 210/400, 401, 385, 783, 210/160, 328, 784

[56] References Cited

U.S. PATENT DOCUMENTS 1,910,860 10/1930 Sayers .
4,059,527 11/1977 Bahr .................................... 210/400

FOREIGN PATENT DOCUMENTS

| C250047 | 12/1910 | Fed. Rep. of Germany . |
| 2923779 | 12/1980 | Fed. Rep. of Germany . |
| 3221288 | 12/1983 | Fed. Rep. of Germany . |
| A549535 | 3/1922 | France . |
| 297394 | 4/1929 | United Kingdom . |
| 737982 | 10/1955 | United Kingdom . |
| 837289 | 6/1960 | United Kingdom . |
| 1106452 | 3/1968 | United Kingdom . |
| 1439868 | 6/1976 | United Kingdom . |
| 2077139 | 12/1981 | United Kingdom . |

Primary Examiner—Frank Sever
Attorney, Agent, or Firm—Cushman, Darby & Cushman

[57] ABSTRACT

A method of filtering utilizes a filtering apparatus having a filter member presenting a plurality of flow paths therethrough of a form to retain at least a portion of the material to be extracted the method comprising the steps of passing a stream of fluid to be filtered in a forward direction from an inlet through the filter member, moving the filter member out of the stream of fluid, changing the geometry of the filter member under gravity, e.g. by inverting the filter member, to assist in removal of extracted material from the filter member.

10 Claims, 2 Drawing Sheets

METHOD OF AND APPARATUS FOR FILTERING

This invention relates to a method of and apparatus for filtering material from a fluid stream containing such material.

The material filtered from the fluid stream which may be a gaseous fluid or a liquid fluid usually comprises solid state particles. The material extracted, however, may include material of quasi solid form such as gel particles or globule particles of a fluid, more viscous than that which forms the main stream of fluid to be filtered and which may either be intrinsically able to coalecc into such globule particles or adhere to solid state particles. The term "extracted material" as used herein includes both solid state and quasi solid material. The maximum cross-sectional size of passageways afforded by a primary filter member incorporated in the filtering apparatus is determined by the average size of the particle which it is desired to filter from the fluid stream.

One of the problems encountered in methods of an apparatus for filtering is that the passageways afforded by the filter member become blocked or clogged by extracted material. This is especially the case if the fluid to be filtered contains particles having a wide spectrum of sizes because the passageways in the filter member may quickly become blocked initially by larger sized particles. If this clogging occurs, the filter member may thus filter from the fluid stream, particles of smaller size than the passageways in the filter member.

Eventually the clogging results in the severe reduction of the rate of flow of the fluid to be filtered through the primary filter member, and possibly preventing such flow altogether.

Further, filtering apparatus are known which have a secondary filter, finer than the primary filter, to filter fine particles which pass through the primary filter member, from the fluid stream. Such secondary filters also become clogged, in use.

Thus it is often the case that filter members require to be subjected to action to remove extracted material therefrom.

The object of the present invention is to provide a method and a form of filter member which facilitates this operation.

According to one aspect of the invention, we provide a method of filtering utilising a filtering apparatus having at least one filter member presenting a plurality of flow paths therethrough of a form to retain, in use, at least a portion of material to be extracted (herein called the extracted material) from a stream of fluid to be filtered, characterised in that said method comprises the steps of passing a stream of fluid to be filtered through the filter member with the filter member in a filtering position, moving the filter member out of the fluid stream, changing the orientation of the filter member under gravity, to remove extracted material from the filter member.

Because the change in orientation of the filter member is achieved under gravity, there is no necessity to provide any method step or means, for acting on the filter member to cause said change in orientation although as described below the filter member may be flushed if required.

It will be appreciated that as the orientation of the filter member is changed, extracted material collected by the primary filter member is removed from the filter member, as the geometry of the filter member will change.

From a second aspect, the invention resides in the provision of a filtering apparatus for filtering material from a stream of fluid to be filtered, said apparatus comprising at least one filter member which, when in a filtering position, presents a plurality of flow paths therethrough to the stream of fluid, means to move the member out of the stream of fluid, means to change the orientation of the filter member under gravity from the filtering position in which the member presents constriction to said fluid in a forward direction so that material is extracted from the fluid by the filter member, to another position wherein extracted material is removed from the filter member.

The filtering apparatus may have a plurality of filter members provided, each comprising a section of a continuous belt conveyor, and each presenting said flow paths to the stream of fluid, the belt being movable to move each filter member in turn from its filtering position in which the fluid is constrained to pass in the forward direction through the flow paths, to said another position out of the fluid flow, at which the orientation of the filter member may be changed.

The invention will now be described, by way of example, with reference to the accompanying drawing in which.

Figure 1:
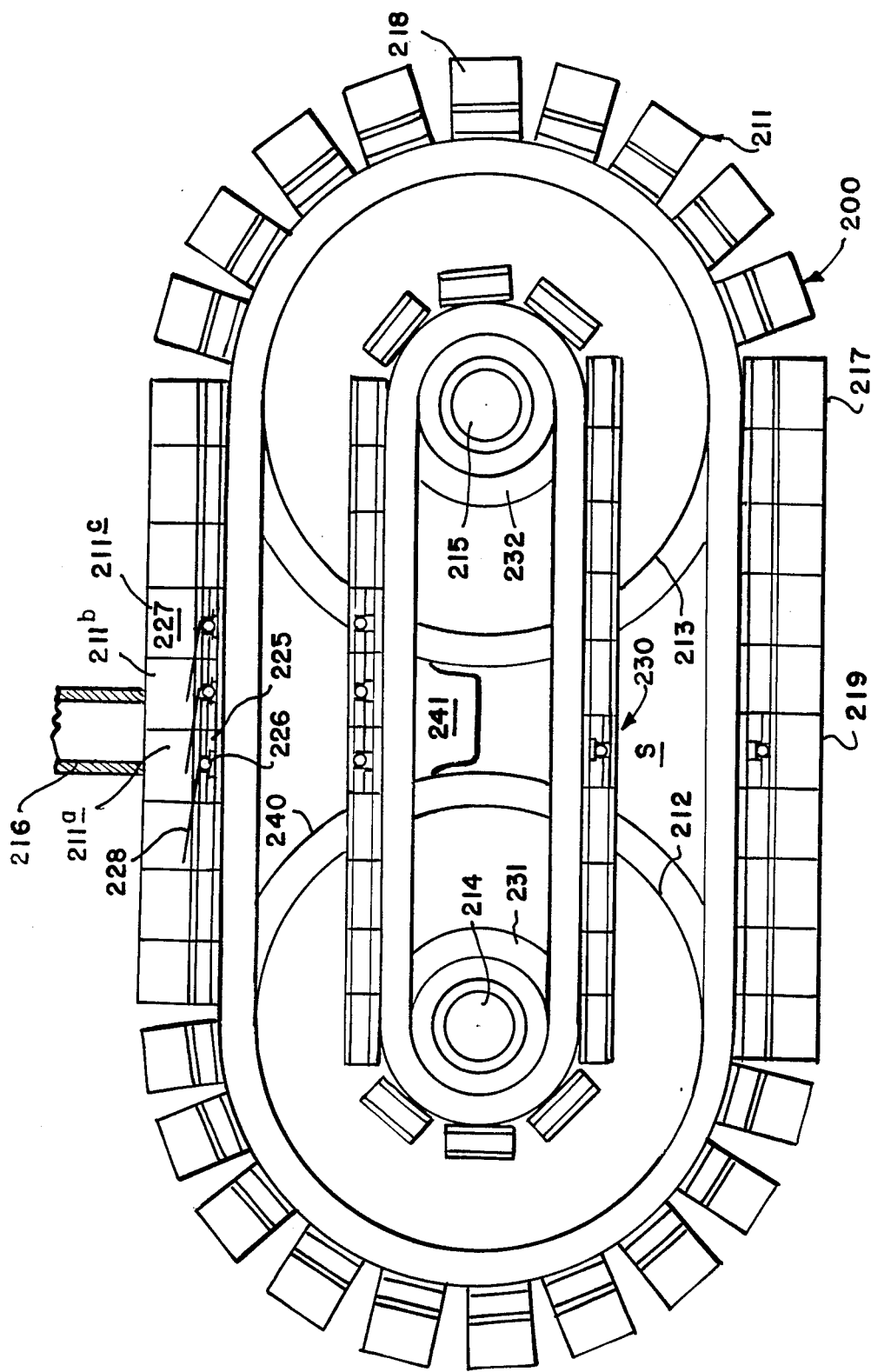
FIG. 1 is a side schematic sectional view of filtering apparatus in accordance with the second aspect of the invention for use in the method according to the first aspect of the invention.

Referring first to FIG. 1, a filtering apparatus 200 comprises a plurality of filter members, some of which are indicated at 211a, 211b, 211c each comprising a section of a continuous belt conveyor. The belt 211 is received around a pair of sprockets 212, 213 rotated about respective axes 214, 215 by any desired drive means.

An upper length of belt 211 which extends between the sprockets 212, 213 is located beneath a duct 216 of a coolant fluid system, so that coolant fluid contaminated with swarf and the like will pass from the duct 216 through the belt by which the swarf and other material is extracted, to enable the coolant to be re-cycled.

The filter members 211a, 211b, 211c, each have a base member 225 comprising a pair of strips, one strip either side of the belt between which extend in each filter member 211a, 211b and 211c a retaining element comprising a wire 226.

The strips which form the base member 225 are each interconnected to allow movement between the sections as hereinafter described, and each have means to engage the sprockets 212, 213 so that drive is transmitted to the belt 211.

For example, the sprockets 212, 213 could be toothed, in which case the strips or one of the strips could comprise a chain to receive the teeth of the sprockets 212, 213 or alternatively, the drive may be transmitted by friction only or in any other desired manner.

The sections 211a, 211b, 211c each have side members 227 which extend away from the base member 225 either side of the belt.

Although the base members 225 for each of the filter members are interconnected, the side members 227 are disjointed so that as the filter members engage around the sprockets 212, 213, the sections can separate and thus move relative to one another, although when the sections are beneath the duct 216, i.e. in a straight run between the sprockets 212,213, the side members 227 engage one another and form a continuous filter bed.

The retaining elements 226 each retain a filter element 220. It can be seen that along the straight run at the upper side of the belt 211 adjacent the duct 216, the filter elements 228 overlap. In the present case, the sprockets 212, 213 rotate clockwise and the filter elements 228 overlap so that each filter element 228 overlaps the next left filter element.

The filter elements 228 are not constrained at their sides remote from the retaining elements 226 and are thus free to pivot either about the wires or are attached to the wires 226 which are themselves free to pivot relative to the base members 225.

The filter elements 228 are each made of aluminum or other metal gauze, or material which may be impregnated so as not to be absorbent of the coolant to be filtered.

The filter elements 228 thus present a plurality of flow paths through the filter members 211a, 211b, 211c to remove extracted material from the fluid to be filtered as the sections of the belt 211 pass into the fluid flow beneath duct 216.

The sprockets 212, 213 may be rotated in steps as required, but preferably are continuously rotated slowly so that fresh parts of the belt 211 are continuously located beneath the duct 216 and thus presented to the stream of fluid to be filtered.

As the filter member sections of the belt 211 move away from beneath the duct 216, they carry with them extracted material, whilst the filtered fluid passes through the belt 211 for further filtering as hereinafter described. Because the filter elements 228 are free to pivot, they will begin to separate from one another from the overlapped position as the filter members 211a, 211b, 211c engage the sprocket 213, under the influence of gravity. As the filter members reach the position at which filter member 218 is shown, the filter elements 228 will be generally vertical and the extracted material on the filter elements 228 will become dislodged and thus removed under gravity downwardly from the belt 211. Of course, by the time the filter members disengage the sprocket 213 to travel along the lower straight section, e.g. at the position occupied by filter member 217, the filter elements 218 will be inverted hanging vertically retained by their retaining elements 226.

If desired, means may be provided such as a reverse flow of fluid through the filter elements 228 to flush the filter elements 228 with fluid as they pass along the lower straight 219 of the belt 211.

As the filter members 211a, 211b, 211c engage sprocket 212, the filter elements 228 will again assume their overlapped position, again under gravity and when they disengage the sprocket 212, they will again present in their overlapped extracted material free condition, flow paths therethrough for the fluid to be filtered introduced through the duct 216.

Thus the filter elements 228 will be continuously cleaned allowing for continuous filtering of the fluid without any need to periodically stop filtering and remove extracted material from the filter members.

After prolonged use, it may be required to present the opposite sides of the filter elements 228 to the fluid to be filtered so that the fluid to be filtered will flush and remove any stubborn extracted material attached to the previously upward facing surface. This can be simply achieved in this embodiment by reversing the direction of rotation of the sprockets 212, 213. The filter elements 228 will assume an opposite overlapped condition, i.e. each filter element 228 will overlap the next right filter element.

It can be seen that located inwardly of the belt 211, a second conveyor belt 230 is provided which is carried by a further pair of sprockets 231, 232 which also rotate about axes 214, 215, the belt 230 also comprising a plurality of filter member sections similar to the belt 211.

Preferably, the sprockets 231 and 232 rotate in the same direction as the sprockets 212 and 213 and thus may be driven from a common drive means.

The construction of the belt 230 is substantially similar to the construction of the belt 211, although the filter elements of the filter members are smaller, but could be of the same or larger size as the elements 218 of belt 211.

Furthermore, the fluid flow paths presented by the filter elements thereof are smaller so that the second filter members provide a finer degree of filtering than the first filter members 211a, 211b, 211c.

The fluid which passes from duct 216 through the first filter members of belt 211 is guided by a guide 240 to pass through the second filter members of belt 230. The thus twice filtered fluid is then removed from a space 241 inwardly of the second belt 230 by suitable duct means (not shown) for recycling.

Alternatively, the belt conveyor could be arranged to permit the filtered fluid to pass through the lower tracks between the sprockets 231, 232 also, and to be collected and recycled from space 5. This would be of advantage in that the filter elements of the belt 230 would be flushed, but of disadvantage in that the filtering efficiency would be lowered. However this may be acceptable in some circumstances.

The filtering apparatus described with reference to FIG. 1 can be made an integral part of a machine tool or a separate unit as required.

The axes 214,1 215 may be separated by any required distance provided that the belts 211, 230 are made sufficiently long. If desired, the second belt 230 may not be provided, or more than two belts, each with filter members, may be provided.

Figure 2:
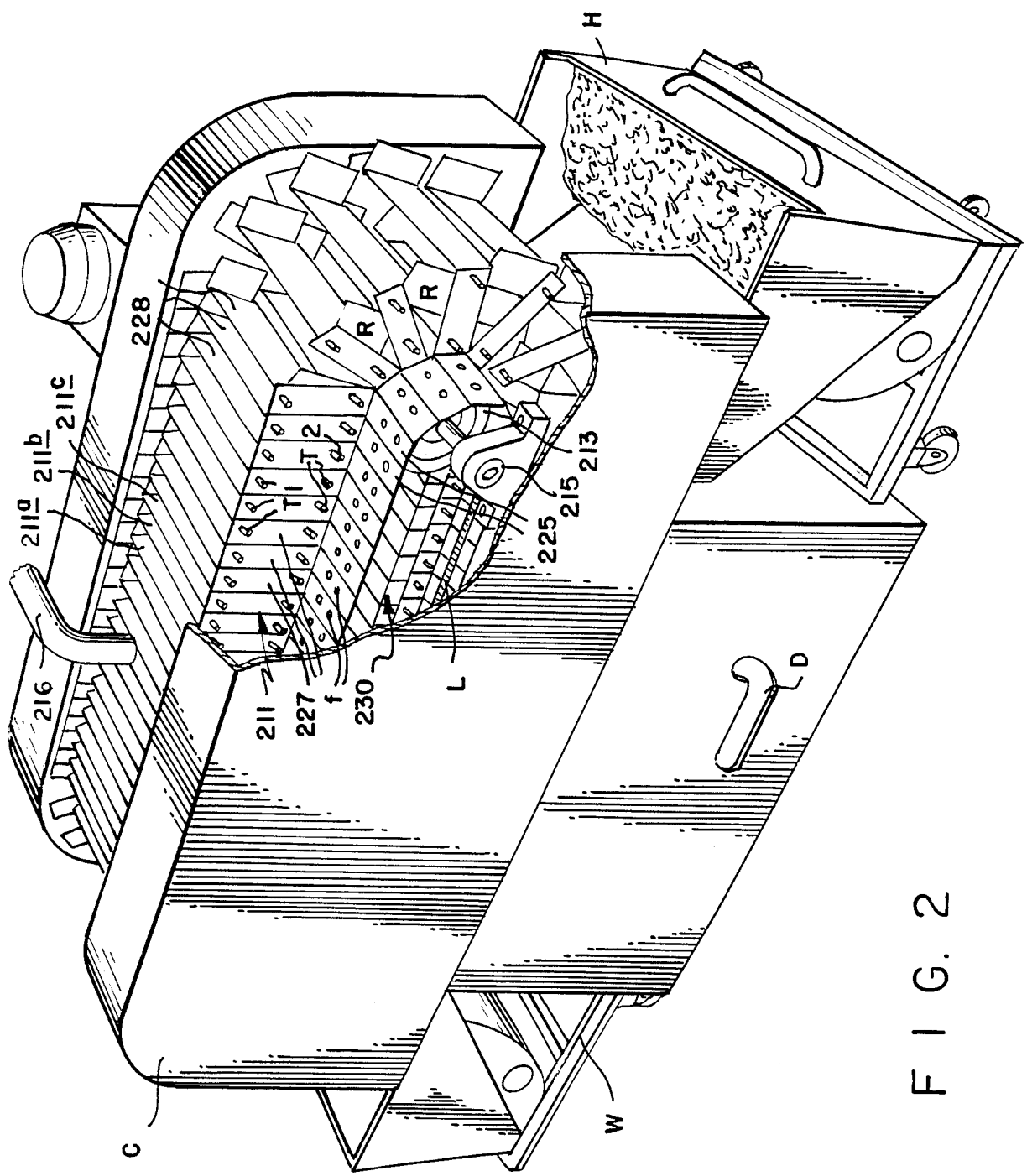
FIG. 2 is a perspective view, partly broken away, of a practical form of the embodiment shown in FIG. 1.

Referring now to FIG. 2, a practical example of a continuous conveyor belt filter apparatus such as described in FIG. 1 is illustrated. Parts corresponding to parts of FIG. 1 are given the same reference numerals.

It can be seen that the apparatus comprises first 211 and second 230 belts enclosed in a casing C.

The inlet duct 216 for fluid to be filtered comprises a pipe which extends for example to a machine tool or group of machine tools from where contaminated coolant is fed.

The filter members 211a, 211b, 211c of belt 211 each have side strips 227 pivotally fixed at their lower ends by rivets $T_1$, to base members 225, and are pivotally mounted at their upper ends by studs $T_2$ to filter elements 228.

The base members 225 extend outwardly of the filter elements 211a, 211b, 211c and have locating formations F which are engaged by the teeth of the sprockets 212, 213 to impart drive to the belt 211.

The filter elements 228 are carried on a frame R for rigidity, and overlap at least when between sprockets 212, 213 (only sprocket 213 of which can be seen) to present a continuous filter surface to the fluid introduced through duct 211.

The second belt 230 is similarly constructed, but has an integral chain L which engages further sprockets 231, 232 (not shown) which rotate about axes coincident with the axes 214, 215 of rotation of sprockets 212, 213.

Swarf which is dislodged from the filter elements 211a, 211b, 211c as they pass around sprocket 213, is dislodged into a chute H which is removable from the remainder of the casing to permit of disposal of the swarf.

Filtered coolant passes from the casing by a further duct D for recirculation as required.

It can be seen that the apparatus is provided on a wheeled carriage W and thus may be moved around a machine shop for example to any required position.

I claim:

1. A method comprising: filtering using a filtering apparatus having first and second filter members each presenting a plurality of flow paths therethrough of a form to retain at least a proportion of extracted material to be extracted from a stream of fluid to be filtered, at least the first filter member comprising a plurality of filter elements which, when in a filtering position, at least partially overlap, by, passing the stream of fluid to be filtered in one direction through the first and second filter members;

moving the filter elements out of the path of the fluid stream so as to preclude clogging of the filtering apparatus;

changing the orientations of both the first and second filter members sufficient to enable the filter elements of the first filter member to move under gravity to at least partially inverted cleaning positions; and removing extracted material from the first and second filter elements.

2. A method according to claim 1 wherein the changing step includes the step of rotating the filter members under gravity about an axis transverse to the one direction.

3. A method according to claim 1 wherein the first and second filter members each comprise part of a respective continuous belt made up of sections, at least one of the sections of each belt having at least one filter element overlapped with a filter element of an adjacent section, the moving step including the step of moving the sections of the belt from a first position in which the fluid is constrained to pass in the one direction through the flow paths to a second position out of the path of fluid flow in which the filter elements can move to their cleaning positions where extracted material is removed therefrom.

4. A method according to claim 1 wherein during the passing step, the filter elements of the first and second elements upon which the stream of fluid impinges, are presented generally upwardly, and during the removing step, the extracted material is discharged therefrom generally downwardly.

5. A method according to claim 1 wherein said removing step includes the step of subjecting each filter member to a reverse flow of fluid.

6. Filtering apparatus comprising:

first and second filter members of a form to retain in use, at least a proportion of extracted material to be extracted from a stream of fluid to be filtered, at least the first filter member comprising a plurality of filter elements which, when in a filtering position, at least partially overlap;

means for moving the first and second filter members out of the stream of fluid; and means for changing the orientations of the first and second filter elements to move the filter elements of the first filter member under the action of gravity from filtering positions wherein the first filter member including means for presenting a constriction to the flow of fluid to be filtered therethrough in a forward direction so that material is extracted from the fluid by the first filter member, to at least partially inverted cleaning positions wherein the extracted material is, removed from the first and second filter members sufficient for preventing clogging of said first and second filter members.

7. Filtering apparatus according to claim 6 wherein the filter members each comprise part of a respective continuous belt made up of sections, at least one of the sections of each belt having at least one filter element overlapped with a filter element of an adjacent section, the belts being movable to move parts of the belt from one position in which the fluid is constrained to pass in the forward direction through the flow paths to a second position in which the filter elements can move to their cleaning positions where extracted material is removed therefrom.

8. Filtering apparatus according to claim 7 wherein the filter elements are each supported by a retaining element secured to the respective belt to permit the filter elements to rotate relative to the belt.

9. Filtering apparatus according to claim 6 including means for subjecting at least the first filter member to a flow of flushing fluid in a direction transverse to the flow of fluid to be filtered to facilitate removal of extracted material from the filter elements of the first filter member when the orientations of the first and second filter members have been changed.

10. Filtering apparatus according to claim 6 wherein the filter members are in the fluid stream, a face of each filter member is presented upwardly and when the orientation thereof has been changed by inverting the members, the extracted material is discharged downwardly.

* * * * *